United States Patent Office 3,050,603
Patented Aug. 21, 1962

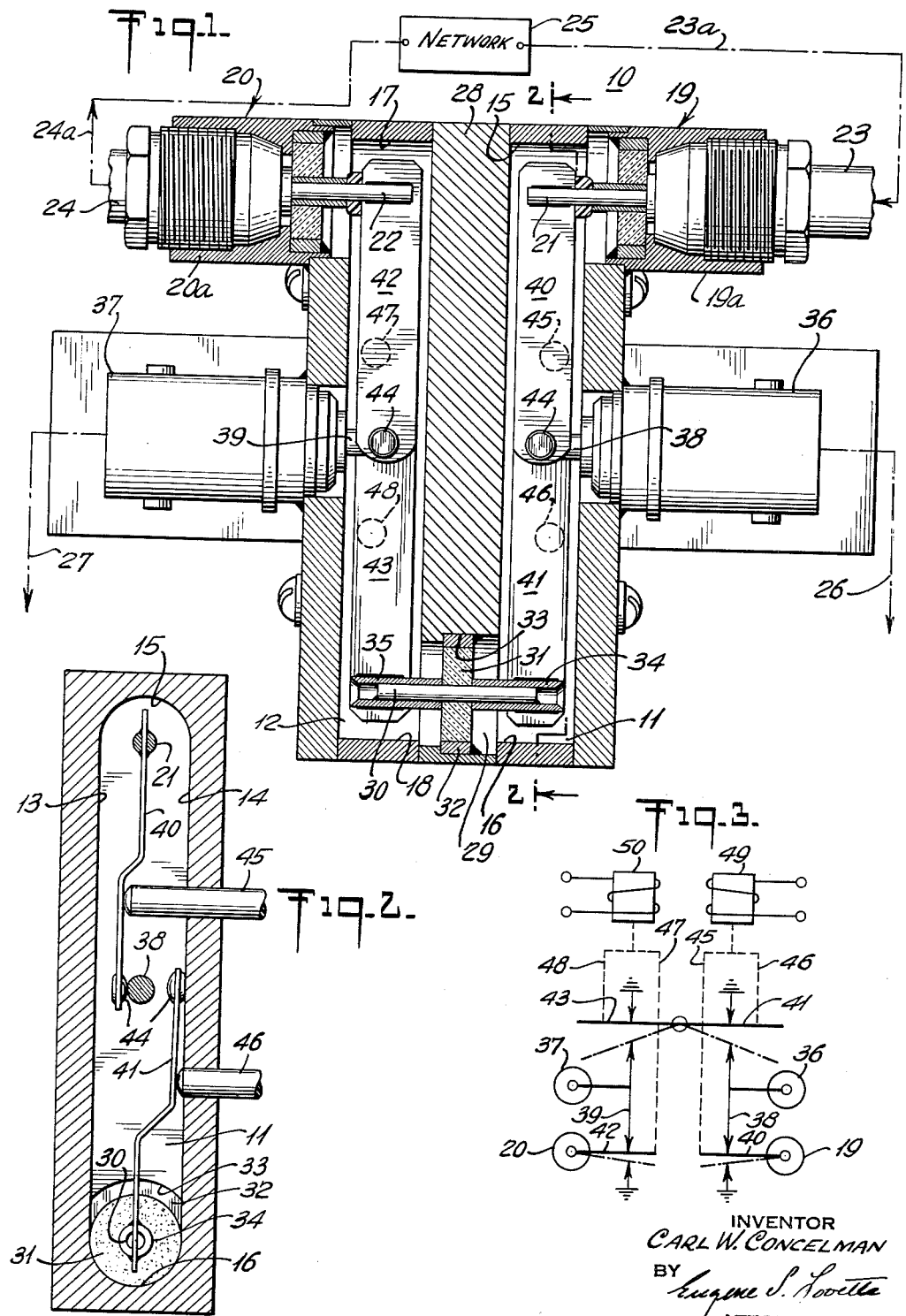

3,050,603
TWO-POSITION COAXIAL SWITCH STRUCTURE
Carl W. Concelman, Danbury, Conn., assignor to Amphenol-Borg Electronics Corporation, Broadview, Ill., a corporation of Delaware
Filed May 27, 1960, Ser. No. 32,410
3 Claims. (Cl. 200—153)

This invention relates to improved two position coaxial switch for connecting an electrical device or network in series relationship with a pair of transmission lines during the normal phase of switch operation and for disconnecting such device or network from said transmission lines by grounding the device or network as the transmission lines are connected directly to each other during a second phase of switch operation.

In prior art circuitry for effecting the foregoing mode of operation, it has been the practice to use two or more coaxial switches and external adapter means. The complexity of such circuitry is now readily eliminated by the improved unitary switch structure of relatively simple design and reliable operation and which also provides the advantage of eliminating the need of external adapters.

It is, therefore, the principal object of the invention to provide a unitary two position coaxial switch adapted to connect and disconnect an electrical device or network in series relationship with respect to a pair of transmission lines, wherein during one phase of switch operation the electrical device or network is connected in series with the pair of transmission lines to provide the desired series circuit. During the other phase of switch operation, the electrical device or network is disconnected from the transmission lines. The switch, in addition, shorts the electrical network or device preferably to ground during this second phase of switch operation to isolate electrically such device or network from the pair of transmission lines, and said pair of lines are connected together.

It is also an object of the invention to provide an improved switch device characterized by economy and simplicity of fabrication and use and which eliminates the need of external adapters for achieving the foregoing modes of operation and, in addition, which provides suitable impedance for interconnecting the aforesaid series circuits or the pair of transmission lines together.

Further objects and advantages will become apparent from the following description of the invention taken in conjunction with the figures, in which:

FIG. 1 is an elevational view partly in section and partly schematic for illustrating a switch incorporating the principles of the invention;

FIG. 2 is a section of the switch taken along line 2—2 of FIG. 1; and

FIG. 3 is a schematic diagram of the switch illustrating its electrical operation.

Reference is now made to the figures for an embodiment of a switch 10 incorporating the principles of the invention. The switch body constituting switch 10 is made of conductive wall members assembled to form a pair of longitudinal chambers 11, 12 spaced back-to-back and in parallel relationship. Each chamber 11, 12 is defined by the interior surfaces of opposite conductive walls (such as walls 13, 14 in FIG. 2) including end walls 15, 16 seen also in the cross-sectional view of FIG. 2. FIG. 2 is a section looking into chamber 11. It will be understood that both chambers 11, 12 are alike in construction and operation.

A pair of transmission line connectors 19, 20 are supported in known manner at one end of the switch body structure wherein each connector 19, 20 has an inner conductor 21, 22 extending into a respective one of chambers 11, 12. The outer conductors 19a, 20a of connectors 19, 20 are in conductive connection with the chamber walls. Each connector 19, 20 is shown conductively connected to an individual coaxial cable 23, 24. Cables 23, 24 connect to the input and output of network means 25 depicted by block diagram. The continuation of cables 23, 24 are shown by dashed lines 23a, 24a for connection to network 25. Network 25 may be a filter, amplifier or any other electrical device which in accordance with alternate phases of switch operation is to be connected in series relationship with another pair of transmission lines 26, 27 or electrically isolated therefrom by having the ends of network 25 grounded.

In the preferred embodiment of the switch structure as shown herein, the switch body is designed so that chambers 11, 12 are disposed in back-to-back relationship to provide a compact and physically small switch 10. Accordingly, chambers 11, 12 are separated by a section of switch body wall 28 extending from the upper end of the switch body as seen in FIG. 1 to the opposite end of the switch body. In accordance with the invention, wall section 28 has a through passage 29, the opposite ends of which communicate with respective ones of chambers 11, 12. The axis of passage 29 is normal to the axes of chambers 11, 12.

A longitudinal pin 30 of conducting material is supported in fixed concentric relationship in through passage 29 by a dielectric bead 31. Pin 30 passes through a central opening in bead 31 and held fast thereat. The opposite ends of pin 30 extend to the respective ones of chambers 11, 12. Dielectric bead 31 is disc shaped and made of suitable material such as glass. The disc shaped bead 31 is held in fixed concentric relationship in passage 29 as shown in FIG. 1 by an annular conductive ring 32 fixed to the periphery of bead 31. Ring 32 is soldered to the bore surface 33 of passage 29. A pair of sleeves 34, 35 of conductive material are mounted over and fixed to the sections of pin 30 on the opposite sides of bead 31. Sleeves individually extend into chambers 11, 12, respectively, to define an inner conductor terminal in each chamber adjacent its lower end wall. The diameters of the ring 32, the bore of passage 33 and sleeves 34, 35 in combination with the geometry and electrical characteristics of bead 31 are selected to provide a short section of coaxial line of suitable impedance for transmitting electromagnetic energy from one chamber to the other. In addition, ring 32 and sleeves 34, 35 also provide structural rigidity for supporting pin 30 and dielectric bead 31 in desired concentric relationship for defining the short section of coaxial line for coupling the two chambers.

An additional pair of connectors 36, 37 are supported by the switch body intermediate the end walls thereof. Each connector 36, 37 has an individual inner conductor 38, 39 extending into a respective one of chambers 11, 12 between the end walls thereof. The outer conductors of connectors 36, 37 make conductive contact with the chamber walls. As depicted in FIG. 1, each connector 36, 37 is adapted for connection with an individual one of transmission lines 26, 27 shown schematically by dashed lines.

Each chamber 11, 12 is provided with a pair of longitudinal, resilient and flexible conductive switch arms 40, 41 and 42, 43. Each arm of the pair in each chamber has one fixed end conductively connected to and supported by a correlated one of the end inner conductors extending into the chamber containing the arms. In other words, the inner conductors supporting the arms are those adjacent the chamber end walls as shown in the figures. Each arm of the pair in each chamber has a free end adapted to alternate between one side of the middle inner conductor 38 or 39 and the confronting upper or lower chamber wall. In this instance, the terms "upper" and "lower" are referred to FIG. 1 for their relative meanings. For example, the free end of arm 40 will normally make contact with the upper side of inner conductor 38, as the free end of arm 41 normally makes contact with the lower chamber wall 14. The foregoing is also shown in FIG. 2. At the same time, the switch arms 42, 43 in chamber 12 are similarly disposed, that is to say, the free end of arm 42 will normally make contact with the upper side of inner conductor 39 while the free end of arm 43 is normally making contact with the lower chamber wall. The foregoing disposition of the switch arms 40, 41 and 42, 43 represents the phase of switch operation wherein network 25 is connected in electrical series relationship with transmission lines 26, 27. The series connection path from line 26 to line 27 includes connector 36, switch arm 40, connector 19, cable 23, network 25, cable 24, connector 20, switch arm 42, and connector 37 to line 27. The other arms 41, 43 are electrically isolated from the aforesaid series circuit because their free ends are grounded to the switch body. The foregoing phase of switch operation is also shown schematically in FIG. 3 wherein arms 40, 42 (shown in solid line) are making normally closed contact with conductors 38, 39, respectively, as arms 41, 43 (also shown in solid line) are both grounded. The free ends of the four arms are each provided with a terminal contact 44 to effect good electrical contact with the inner conductors and chamber walls as the case may be.

The second phase of switch operation electrically isolates network 25 from transmission lines 26, 27 and is brought about by simultaneously moving the free end of each switch arm to the second of their positions. In chamber 11, it means that the free end of arm 40 now connects with chamber wall 13 as the free end of arm 41 connects with the underside of inner conductor 38. In chamber 12, the free end of arm 42 now connects with the chamber wall as the free end of arm 43 connects with inner conductor 39. By reason of this arrangement, network 25 is shorted and transmission line 26 is connected to transmission line 27 through connector 36, arm 41, the short section of coaxial line interconnecting the chambers, arm 43 and connector 37 to line 27. This arrangement is shown schematically in FIG. 3 wherein switch arms 40 to 43 are depicted by long and short dashed lines.

Actuation of the free ends of switch arms 40 to 43 from one to the other of their two positions for alternating the switch 10 from one to the other of its two phases of operation is affected by four dielectric members 45 to 48. Each chamber 11, 12 is provided with suitable openings for receiving in slidable relationship a pair of members 45, 46 and 47, 48, respectively. The inner ends of the four members 45 to 48 in the chambers are in register with a respective one of the switch arms for actuating the free ends thereof upon movement being imparted to the dielectric members. The exterior ends of dielectric members 45 to 48 are not shown herein. However, each member 45, 46 and 47, 48 of a pair for each chamber is mechanically associated with a clapper relay mounted on the exterior of the switch body in accordance with well known techniques in the art, for example, as shown in Patent No. 2,859,311, issued November 4, 1958 for "Electrical Switch." The embodiment illustrated herein employs two clapper relays 49, 50, wherein relay 49 is adapted to operate upon members 45, 46 and relay 50 similarly operates upon members 47, 48. This is shown schematically in FIG. 3.

Operation of switch 10, as contemplated herein, is as follows. Relays 49, 50 are simultaneously either both energized or both de-energized and when de-energized, the four dielectric members 45 to 48 are in withdrawn position to effect the first phase of switch operation, i.e., network 25 is in series with lines 26, 27. When the two relays are simultaneously energized, the four dielectric members 45 to 48 are depressed to actuate the four switch arms which throws the switch into its second phase of operation, i.e., to short out network 25. Upon de-actuation of relays 49, 50, switch 10 returns to the first phase of operation by reason of the return resilient characteristics of switch arms 40 to 43.

The geometries of the switch arms and the operatively associated chambers containing the arms are suitably selected to provide coaxial sections of transmission lines of desired line impedance to effect the interconnection of network 25 with transmission lines 26, 27 and to effect direct connection of these transmission lines during the shorting phase of switch operation. Furthermore, it will be understood that from the foregoing description, that the mode of operation provided by switch 10 is carried out without any external or additional adapter and this is made possible by reason of the fact that in accordance with the invention, the back-to-back chambers are interconnected by the short section of coaxial line made up of member 30 and bore 29.

It is intended that all matter contained in the above description or shown in the accompanying drawings shall be interpreted as illustrative and not in a limiting sense.

What is claimed is:

1. A coaxial switch for making and breaking electrical series connection between an electrical network or the like and electromagnetic wave transmission lines comprising, a switch body having a pair of internal and longitudinal chambers defined by opposite interior conducting walls including end walls, each of said chambers having first and second ends adjacent the respective end walls thereof, the walls of said switch body chambers having a common bore communicating with each chamber adjacent the first ends of said individual chambers, an inner conductor member coaxially supported in said common bore, said inner conductor member having opposite sections projecting into the individual chambers at the first ends thereof, a first pair of connector means supported by said switch body and each having an individual inner conductor section extending into an individual chamber adjacent the second end thereof for electrically connecting each chamber in electrical series relationship with said network, a second pair of connector means for making connection with the individual ones of said transmission lines and supported by said switch body, each of said second connector means having an individual inner conductor element extending into an individual chamber between the first and second ends thereof, a pair of flexible and longitudinal conductive switch arms in each chamber wherein each arm of said pair is fixedly connected to an individual inner conductor section adjacent the first and second chamber ends, each arm of a pair having a free end for make and break electrical contact with the inner conductor element in the chamber containing said pair of arms, and means for moving said arms from a first to a second of two positions for alternate phases of switch operation, the arms in said chambers and connected to the inner conductors of said first pair of connector means having their free ends making contact with respective ones of said inner conductor elements of the second pair of connector means as the free ends of the other arms in said chambers make contact with said chamber walls for one phase of switch operation for connecting said network in electrical series relationship with said transmission lines, the arms in said chambers and connected to the inner conductors of said first pair of connectors having their free ends making contact with the chamber walls as the free ends of the other arms in said chambers make contact with the respective inner conductor elements of the second pair of connector means for the other phase of switch operation for shorting said network and for connecting said transmission lines in electrical series relationship.

2. Apparatus as defined in claim 1 wherein, each of the inner conductor elements of said second pair of connector means having upper and lower opposite sides confronting respectively upper and lower chamber walls of the chamber containing the individual inner conductor element, the free end of one switch arm in each chamber being disposed for alternate movement between the upper side of its respective inner conductor element and the confronting upper chamber wall as the free end of the other arm in the same chamber is disposed for alternate movement between the lower chamber wall and the confronting underside of the inner conductor element.

3. Apparatus as defined in claim 1 wherein, said chambers are in lengthwise parallel relationship and have a common chamber wall, said common bore extending through said common chamber wall and having an axial dimension perpendicular to the axes of said chambers, said common chamber wall being continuous except for said common bore at one end thereof, and dielectric means supported in said common bore and holding said inner conductor member concentric with respect to said bore.

References Cited in the file of this patent

UNITED STATES PATENTS 2,859,311     Concelman _____ Nov. 4, 1958